United States Patent
Kudo

(10) Patent No.: US 9,591,205 B2
(45) Date of Patent: Mar. 7, 2017

(54) FOCUS CONTROL APPARATUS, OPTICAL APPARATUS, FOCUS CONTROL METHOD, AND STORAGE MEDIUM STORING FOCUS DETECTION PROGRAM

(71) Applicant: CANON KABUSHIKI KAISHA, Tokyo (JP)

(72) Inventor: Keisuke Kudo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/962,200

(22) Filed: Dec. 8, 2015

(65) Prior Publication Data

US 2016/0173760 A1    Jun. 16, 2016

(30) Foreign Application Priority Data

Dec. 16, 2014   (JP) ................................ 2014-254163

(51) Int. Cl.
   *H04N 5/232*   (2006.01)
(52) U.S. Cl.
   CPC .............................. *H04N 5/23212* (2013.01)
(58) Field of Classification Search
   None
   See application file for complete search history.

(56) References Cited

U.S. PATENT DOCUMENTS

| 2004/0202461 | A1* | 10/2004 | Nakahara | G02B 7/285 396/104 |
| 2010/0150538 | A1* | 6/2010 | Ono | G03B 13/00 396/104 |
| 2014/0320736 | A1* | 10/2014 | Tomita | G02B 7/34 348/353 |
| 2014/0347549 | A1* | 11/2014 | Nakamoto | G02B 7/36 348/349 |
| 2015/0365584 | A1* | 12/2015 | Samurov | G03B 13/36 348/349 |
| 2016/0006948 | A1* | 1/2016 | Takao | H04N 5/2628 348/345 |
| 2016/0150153 | A1* | 5/2016 | Sakurabu | G02B 7/28 348/353 |

(Continued)

FOREIGN PATENT DOCUMENTS

JP   2010-256824 A   11/2010

*Primary Examiner* — Timothy J Henn
(74) *Attorney, Agent, or Firm* — Fitzpatrick, Cella, Harper & Scinto

(57) ABSTRACT

The focus control apparatus drives a focus element by following drive amounts: when a reliability of a phase difference focus detection is higher than a first reliability and a defocus amount is larger than a first defocus amount, a first drive amount that is smaller than a phase difference in-focus drive amount by a first non-drive amount; when the reliability is higher than the first reliability and the defocus amount is smaller than the first defocus amount, the phase difference in-focus drive amount; and when the reliability is lower than the first reliability and higher than a second reliability and the defocus amount is larger than a second defocus amount, a second drive amount that is smaller than the phase difference in-focus drive amount by a second non-drive amount. The apparatus drives the focus element, in other cases, by using the contrast evaluation value.

7 Claims, 6 Drawing Sheets

(56) References Cited

U.S. PATENT DOCUMENTS

| | | | |
|---|---|---|---|
| 2016/0156836 A1* | 6/2016 | Aoki | G02B 7/34 |
| | | | 348/345 |
| 2016/0205315 A1* | 7/2016 | Irie | G02B 7/28 |
| | | | 348/353 |

* cited by examiner

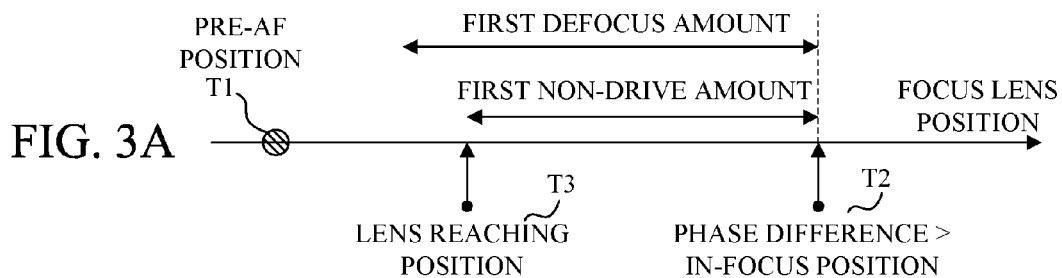
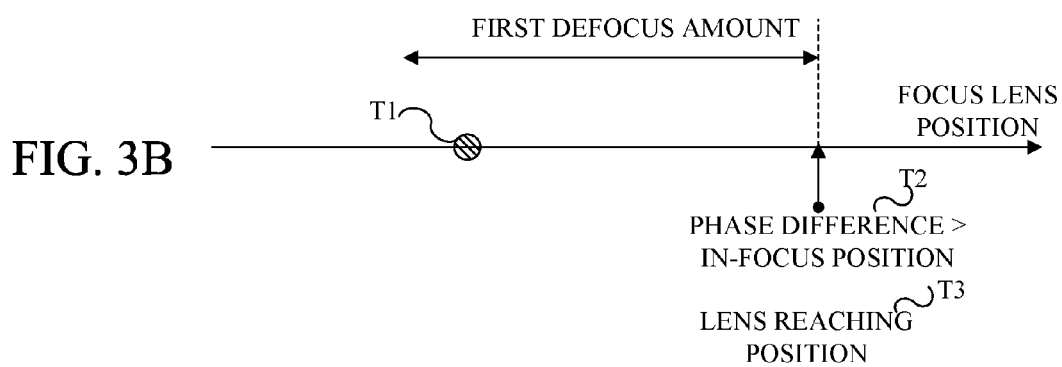
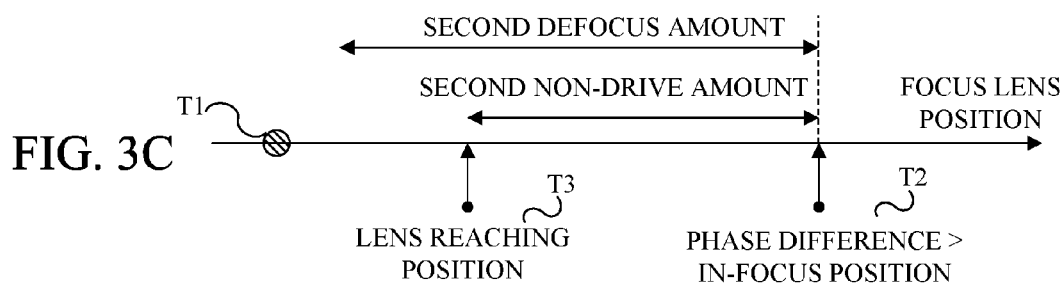
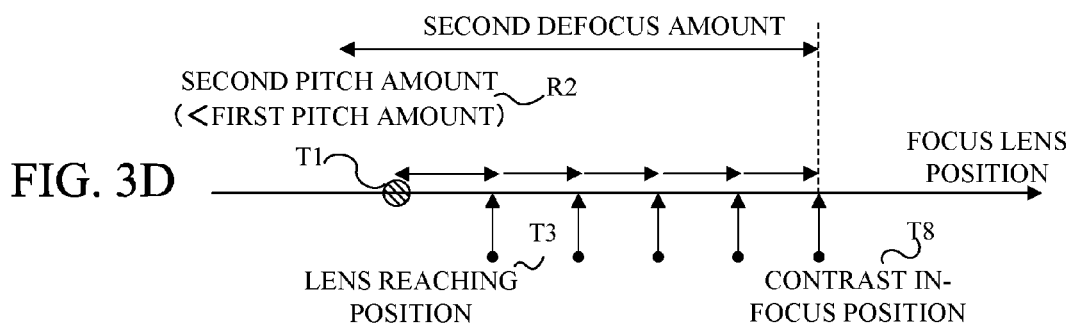

FOCUS CONTROL APPARATUS, OPTICAL APPARATUS, FOCUS CONTROL METHOD, AND STORAGE MEDIUM STORING FOCUS DETECTION PROGRAM

BACKGROUND OF THE INVENTION

Field of the Invention

The present invention relates to focus control in an image capturing apparatus such as a digital still camera or a digital video camera and in an optical apparatus such as an interchangeable lens, and particularly to focus control using both an imaging surface phase difference AF and a contrast AF.

Description of the Related Art

The imaging surface phase difference AF uses paired object images formed on an image sensor for image capturing of an object through an optical system. The paired object images have a shift amount corresponding to a focus state of an image capturing system constituted by the optical system and the image sensor. Then, the imaging surface phase difference AF further calculates a defocus amount of the image capturing system by using a shift amount (phase difference) between paired image signals obtained by photoelectrically converting the paired object images by the image sensor and moves a focus element by a drive amount calculated from the defocus amount to thereby acquire an in-focus state of the image capturing system.

On the other hand, the contrast AF extracts a high frequency component from an output of the image sensor which is obtained by photoelectrically converting an object image to acquire a contrast evaluation value representing a contrast state of the object image. Then, the contrast AF moves the focus element to an in-focus position at which the contrast evaluation value becomes a maximum (peak) value to thereby acquire an in-focus state.

Japanese Patent Laid-open No. 2010-256824 discloses an image capturing apparatus that fast and highly accurately achieves an in-focus state by moving a focus lens to a vicinity of a position (in-focus position) at which the in-focus state is acquired, on a basis of a focus detection result obtained by the phase difference AF and by then performing the contrast AF. Furthermore, the image capturing apparatus disclosed in Japanese Patent Laid-open No. 2010-256824 moves, when the focus detection result obtained by the phase difference AF has a high reliability, the focus lens to a closer position to the in-focus position on a basis of this focus detection result and then performs the contrast AF. This enables the in-focus state to be acquired faster.

However, as the image capturing apparatus disclosed in Japanese Patent Laid-open No. 2010-256824, performing the contrast AF after the phase difference AF may fail to acquire an in-focus state sufficiently fast because of a condition of an object such as a low contrast.

SUMMARY OF THE INVENTION

The present invention provides a focus control apparatus and an optical apparatus which are capable of fast and highly accurately acquiring an in-focus state for various kinds of objects by using both a phase difference AF and a contrast AF.

The present invention provides as an aspect thereof a focus control apparatus configured to control drive of a focus element movable in an image capturing system that photoelectrically converts, by an image sensor, an object image formed by an optical system. The apparatus includes a first focus detector configured to perform a phase difference focus detection to calculate, from a phase difference between paired image signals produced using an output from the image sensor, a defocus amount of the image capturing system, a second focus detector configured to produce, with the focus element being driven, a contrast evaluation value corresponding to a contrast of the object image using the output from the image sensor, a reliability acquirer configured to acquire a reliability of the phase difference focus detection on a basis of a coincidence degree of the paired image signals and a contrast of the paired image signals, and a controller configured to control the drive of the focus element on a basis of a phase difference in-focus drive amount that is a drive amount of the focus element to bring the image capturing system into a phase difference in-focus state and that is calculated from the defocus amount and configured to control the drive of the focus element to bring the image capturing system into a contrast in-focus state by using the contrast evaluation value. The controller is configured to drive the focus element by following drive amounts:

when the reliability is higher than a first reliability and the defocus amount is larger than a first defocus amount, a first drive amount that is smaller than the phase difference in-focus drive amount by a first non-drive amount;

when the reliability is higher than the first reliability and the defocus amount is smaller than the first defocus amount, the phase difference in-focus drive amount; and when the reliability is lower than the first reliability and higher than a second reliability and the defocus amount is larger than a second defocus amount, a second drive amount that is smaller than the phase difference in-focus drive amount by a second non-drive amount. The controller is configured to drive the focus element, when the reliability is lower than the first reliability and higher than the second reliability and the defocus amount is smaller than the second defocus amount and when the reliability is lower than the second reliability, by using the contrast evaluation value.

The present invention provides as another aspect thereof an optical apparatus including the above focus control apparatus.

The present invention provides as still another aspect thereof a focus control method of controlling drive of a focus element movable in an image capturing system that photoelectrically converts, by an image sensor, an object image formed by an optical system. The method includes a step of performing a phase difference focus detection to calculate, from a phase difference between paired image signals produced using an output from the image sensor, a defocus amount of the image capturing system, a step of producing, with the focus element being driven, a contrast evaluation value corresponding to a contrast of the object image using the output from the image sensor, a step of acquiring a reliability of the phase difference focus detection on a basis of a coincidence degree of the paired image signals and a contrast of the paired image signals, and a control step of controlling the drive of the focus element on a basis of a phase difference in-focus drive amount that is a drive amount of the focus element to bring the image capturing system into a phase difference in-focus state and that is calculated from the defocus amount and of controlling the drive of the focus element to bring the image capturing system into a contrast in-focus state by using the contrast evaluation value. At the control step the method drives the focus element by following drive amounts:

when the reliability is higher than a first reliability and the defocus amount is larger than a first defocus amount, a first drive amount that is smaller than the phase difference in-focus drive amount by a first non-drive amount;

when the reliability is higher than the first reliability and the defocus amount is smaller than the first defocus amount, the phase difference in-focus drive amount; and when the reliability is lower than the first reliability and higher than a second reliability and the defocus amount is larger than a second defocus amount, a second drive amount that is smaller than the phase difference in-focus drive amount by a second non-drive amount. The method drives the focus element, when the reliability is lower than the first reliability and higher than the second reliability and the defocus amount is smaller than the second defocus amount and when the reliability is lower than the second reliability, by using the contrast evaluation value.

The present invention provides as yet another aspect thereof a non-transitory computer-readable storage medium storing a focus control program as a computer program to cause a computer of an optical apparatus to perform a process according to the above focus control method.

Further features and aspects of the present invention will become apparent from the following description of exemplary embodiments with reference to the attached drawings.

BRIEF DESCRIPTION OF THE DRAWINGS

FIGS. 3A to 3D illustrate drive of a focus lens in FIG. 1.

DESCRIPTION OF THE EMBODIMENTS

Exemplary embodiments of the present invention will be described below with reference to the attached drawings.

Figure 2:
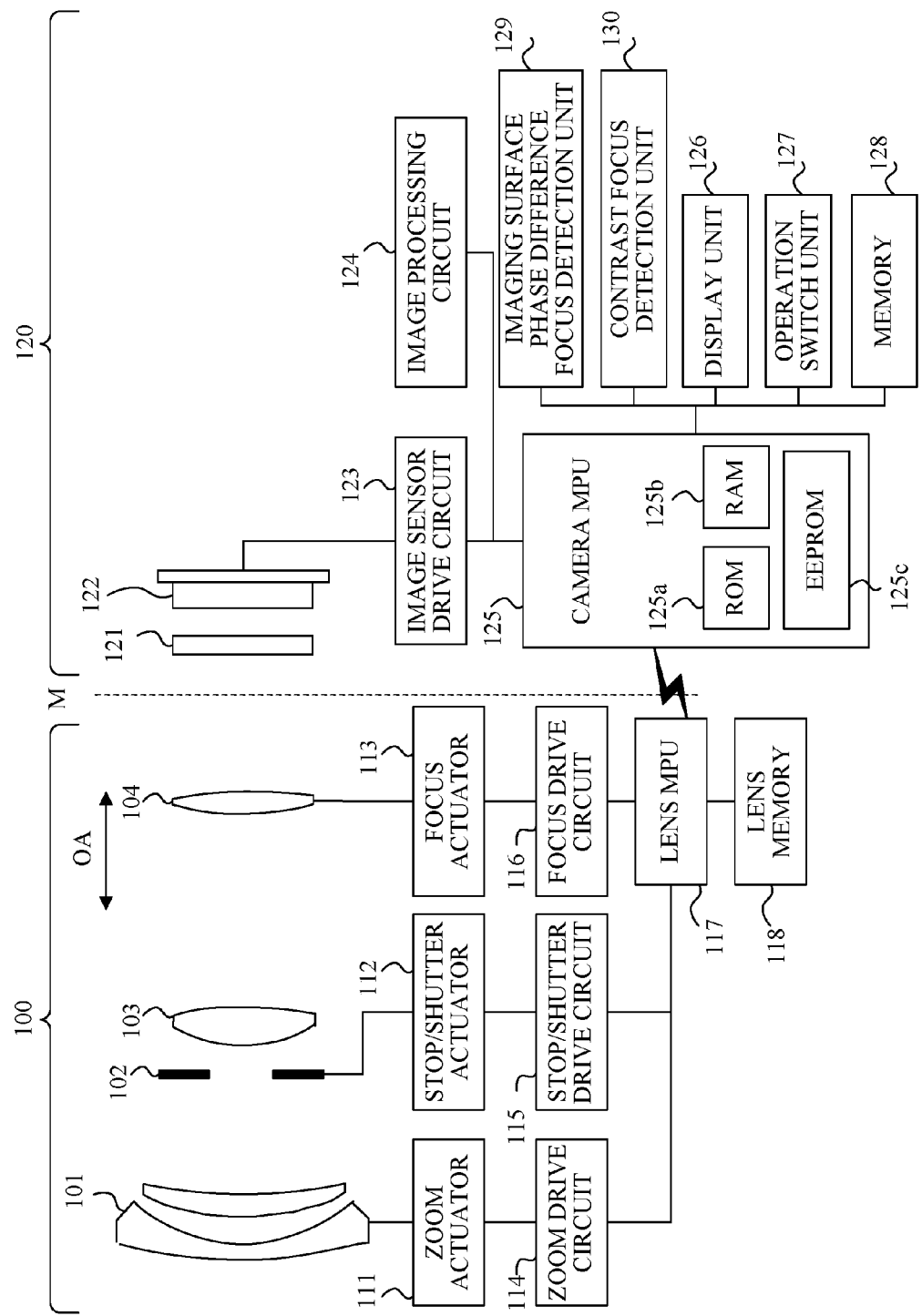
FIG. 2 is a block diagram of a configuration of the image capturing apparatus of this embodiment.

The following embodiments describe, as an image capturing apparatus, a single-lens reflex digital camera to which an interchangeable lens is detachably attachable. FIG. 2 illustrates a configuration of the single-lens reflex digital camera of this embodiment. This camera includes an interchangeable lens unit 100 and a camera body 120. The interchangeable lens unit 100 is detachably connected to the camera body 120 through a mount M illustrated with a dotted line in FIG. 2.

The interchangeable lens unit 100 includes an image-capturing optical system constituted by a first lens unit 101, an aperture stop/shutter unit 102, a second lens unit 103 and a focus lens unit (hereinafter simply referred to as a focus lens) 104 in this order from an object side. The interchangeable lens unit 100 further includes a lens control system described later. The image-capturing optical system forms an object image with light from an object (not illustrated).

The first lens unit 101 is held movably in an optical axis direction OA of the image-capturing optical system. The aperture stop/shutter unit 102 performs a light quantity control by changing its aperture diameter and serves as a shutter at still image capturing. The aperture stop/shutter unit 102 and the second lens unit 103 are integrally moved in the optical axis direction OA so as to perform variation of magnification together with the first lens unit 101 being moved. The focus lens 104 as a focus element is moved in the optical axis direction OA to perform focusing.

The lens control system includes a zoom actuator 111, a stop/shutter actuator 112, a focus actuator 113, a zoom drive circuit 114, a stop/shutter drive circuit 115, a focus drive circuit 116, a lens MPU 117 and a lens memory 118. The zoom actuator 111 moves the first lens unit 101 and the second lens unit 103 in the optical axis direction OA at the variation of magnification. The zoom actuator 111 includes a zoom position detection unit (not illustrated) that detects current positions of the first and second lens units 101 and 103, that is, a current zoom position. The stop/shutter actuator 112 opens and closes the aperture stop/shutter unit 102. The focus actuator 113 moves the focus lens 104 in the optical axis direction OA. The focus actuator 113 includes a focus position detection unit (not illustrated) that detects a current position of the focus lens 104, that is, a current focus position.

The zoom drive circuit 114 drives the zoom actuator 111 in response to a zoom operation by a user. The shutter drive circuit 115 drives the stop/shutter actuator 112. The focus drive circuit 116 drives the focus actuator 113.

The lens MPU 117 is communicable with a camera MPU 125 described later through a communication terminal provided to the mount M. The lens MPU 117 controls the zoom drive circuit 114, the shutter drive circuit 115 and the focus drive circuit 116 in response to commands from the camera MPU 125. The lens MPU 117 also detects the current zoom position and the current focus position and notifies the camera MPU 125 of these positions. The lens memory 118 stores optical information needed for autofocus (AF), and the lens MPU 117 transmits the optical information to the camera MPU 125 in response to a request from the camera MPU 125.

The camera body 120 includes an optical low-pass filter 121, an image sensor 122 and a camera control system described later. The optical low-pass filter 121 reduces false color and moiré in a captured image. The image sensor 122 is constituted by a CMOS sensor and its peripheral circuits and has multiple pixels including horizontally arranged m pixels and vertically arranged n pixels. The image sensor 122 is configured to allow for mutually independent outputs (pixel signals) from the respective pixels. The image-capturing optical system and the image sensor 122 constitute an image capturing system.

The image sensor 122 also includes multiple pixels that output a phase difference focus detection signal to be used to perform a focus detection calculation by a phase difference detection method. The phase difference focus detection signal is produced by photoelectrically converting paired optical images having therebetween a shift amount that depends on a focus state of the image capturing system. This phase difference focus detection signal is used to produce paired image signals corresponding to the paired optical images.

The image sensor 122 may be an image sensor that includes, in addition to multiple image capturing pixels, multiple pairs of phase difference focus detection pixels that photoelectrically convert light fluxes passing through mutually different regions in an exit pupil of the image-capturing optical system. Use of such an image sensor enables producing paired image signals by using outputs from multiple pairs (or part thereof) of the phase difference focus detection pixels. Alternatively, the image sensor 122 may be an image sensor in which each pixel includes a micro lens and paired photoelectric convertors and which can produce paired image signals by photoelectrically converting, by the paired photoelectric convertors, paired optical images formed by two light fluxes divided by the micro lens. An image sensor having this configuration synthesizes outputs from the paired photoelectric convertors of each pixel to produce an image capturing pixel signal.

The camera control system includes an image sensor drive circuit 123, an image processing circuit 124, the camera MPU 125, a display unit 126, an operation switch unit 127 and a memory 128. The camera control system further includes an imaging surface phase difference focus detection unit (first focus detector) 129 and a contrast focus detection unit (second focus detector) 130.

The image sensor drive circuit 123 causes the image sensor 122 to perform a photoelectric conversion operation and a pixel signal readout operation and A/D-converts read-out pixel signals to output digital pixel signal data to the image processing circuit 124 and the camera MPU 125. The image processing circuit 124 performs image processes such as γ conversion and color interpolation on the digital pixel signal data to produce an image signal and further performs processes such as compression on the image signal.

The camera MPU 125 controls the image sensor drive circuit 123, the image processing circuit 124, the display unit 126, an operation SW 127, the memory 128, the imaging surface phase difference focus detection unit (hereinafter simply referred to as "a phase difference focus detection unit") 129 and the contrast focus detection unit 130. The camera MPU 125 transmits commands or requests to the lens MPU 117 and receives optical information of the interchangeable lens unit 100 from the lens MPU 117.

Moreover, the camera MPU 125 performs an AF process as a focus control process while controlling the phase difference focus detection unit 129 and the contrast focus detection unit 130. The camera MPU 125 further performs a correction process to correct, in an imaging surface phase difference AF performed while controlling the phase difference focus detection unit 129, a focus detection result acquired by the phase difference focus detection unit 129, because a reliability of the focus detection result at a focus detection position whose image height is high is lowered due to an influence of vignetting. The camera MPU 125 further performs an image capturing process while controlling the image sensor drive circuit 123 and the image processing circuit 124. The camera MPU 125 includes, as built-in components, a ROM 125a storing computer programs to control various operations of the camera body 120, a RAM 125b storing variables used in various calculations and an EEPROM 125c storing parameters used in various controls.

The display unit 126 is constituted by, for example, an LCD and displays information relating to an image capturing mode, a preview image produced before image capturing for recording, a record image produced by the image capturing for recording, an in-focus state at focus detection and others.

The operation switch unit 127 includes a power switch, a release (image capturing trigger) switch, a zoom operation switch and an image capturing mode selection switch. The memory 128 is a flash memory detachably attachable to the camera body 120 and records the record image.

The phase difference focus detection unit 129 performs a focus detection by the phase difference detection method (that is, a phase difference focus detection). Specifically, the phase difference focus detection unit 129 performs a correlation calculation on the paired image signals produced by using the outputs from the image sensor 122 to calculate a phase difference as a shift amount between the paired image signals. Then, the phase difference focus detection unit 129 calculates, from the phase difference, a defocus amount corresponding to the focus state of the image capturing system (in this embodiment, the image-capturing optical system). The defocus amount can be used to calculate a drive amount (phase difference in-focus drive amount; hereinafter simply referred to as "an in-focus drive amount") of the focus lens 104 to bring the image capturing system into an in-focus state (phase difference in-focus state). The in-focus state of the image capturing system includes not only a state in which the defocus amount is zero but also a state in which the defocus amount is close to zero. In other words, the in-focus state is a state where the focus state is in a predetermined range (in-focus range) in which the image capturing system is considered to be in focus.

On the other hand, the contrast focus detection unit 130 performs a focus detection by a contrast detection method (that is, a contrast focus detection) called a TV-AF method. Specifically, the contrast focus detection unit 130 uses a high frequency component and the like of the image signal produced by the image processing circuit 124 using the outputs from the image sensor 122 to produce a contrast evaluation value (or a TV-AF evaluation value) corresponding to a contrast of the image signal (that is, a contrast of the object image). This contrast evaluation value is produced at each drive of the focus lens 104 by a predetermined drive amount (hereinafter referred to as "an AF pitch amount"). A position of the focus lens 104 at which the contrast evaluation value becomes a maximum (peak) value is an in-focus position (hereinafter referred to as "a contrast in-focus position") to bring the image capturing system into an in-focus state (contrast in-focus state). Although described in detail later, the AF pitch amount is set to a first pitch amount (first predetermined amount) when the focus lens 104 is far away from the contrast in-focus position. Then, when the focus lens 104 is located near the contrast in-focus position, the AF pitch amount is changed to a second pitch amount (second predetermined amount) smaller than the first pitch amount.

As described above, the camera body 120 of this embodiment is capable of performing both the imaging surface phase difference AF (phase difference focus control) and the contrast AF (contrast focus control) and brings the image capturing system into an in-focus state by performing these imaging surface phase difference AF and contrast AF individually or in combination.

Figure 1:
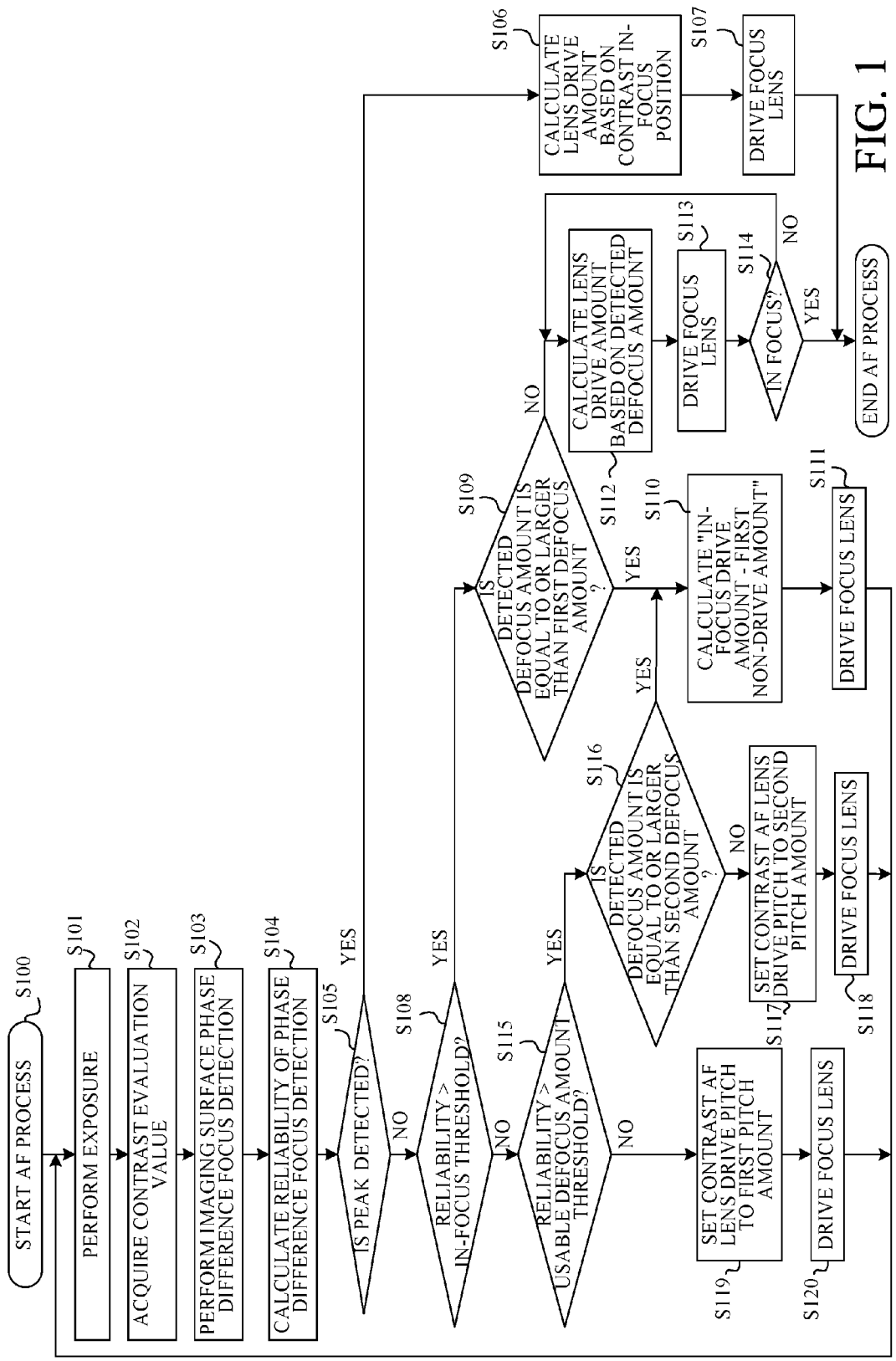
FIG. 1 is a flowchart of an AF process performed in an image capturing apparatus that is an embodiment of the present invention.

Next, description will be made of the AF process performed by the camera MPU 125 with reference to FIG. 1. FIG. 1 is a flowchart of the AF process. The camera MPU 125 as a computer executes this process according to a focus control program as one of the computer programs. The camera MPU 125 also serves as a reliability acquirer and a controller. In FIG. 1, "S" is an abbreviation for step.

The camera MPU 125 starts the AF process at step 100 and then performs an exposure of the image sensor 122 at step 101. This process enables providing paired image signals used for the imaging surface phase difference AF and an output signal from the image sensor 122 to acquire the contrast evaluation value used for the contrast AF.

Next, at step 102, the camera MPU 125 causes the contrast focus detection unit 130 to perform the contrast focus detection. In other words, the camera MPU 125 causes, while driving (moving) the focus lens 104 through the lens MPU 117, the contrast focus detection unit 130 to produce the contrast evaluation value.

Subsequently, at step 103, the camera MPU 125 causes the phase difference focus detection unit 129 to perform a phase difference focus detection. In other words, the camera MPU 125 causes the phase difference focus detection unit 129 to produce the above-described paired image signals, calculate a phase difference therebetween through the correlation calculation thereon and calculate a defocus amount (hereinafter referred to as "a detected defocus amount") from the phase difference.

Next, at step 104, the camera MPU 125 calculates (acquires) a reliability of the phase difference focus detection performed by the phase difference focus detection unit 129. In other words, the camera MPU 125 calculates a reliability of the detected defocus amount acquired by the phase difference focus detection. The reliability is calculated not only on a basis of a coincidence degree of the paired image signals used for the phase difference focus detection, but also on a basis of a contrast of the paired image signals. The reason for taking the contrast of the paired image signals into consideration is that paired image signals obtained from an object having a high contrast can allow a more accurate calculation of the coincidence degree than paired image signals obtained from an object having a low contrast, which results in a more accurate calculation of their phase difference.

Specifically, the reliability is calculated as described below.

First, the coincidence degree of the paired image signals is calculated as described below. A correlation calculation represented by Expression (1) is performed on the paired image signals read out from the phase difference focus detection pixels to calculate a correlation amount Corr(1).

$$Corr(1) = \sum_{k=0}^{n-1-1} |a_k - b_{k+1}| \quad (1)$$

In Expression (1), $a_1$ to $a_n$ represent pixel signals constituting one of the paired image signals, and $b_1$ to $b_n$ represent pixel signals constituting the other of the paired image signals; n is number of the pixel signals in each image signal. Furthermore, 1 represents an image shift amount; the number of the pixel signals is limited to n−1 when the paired image signals are relatively shifted. The image shift amount 1 is an integer and is a relative shift amount in units of intervals of the pixel signals in each image signal. For a highest correlation between the paired image signals, the correlation amount Corr(1) becomes a local minimal value.

Then, a shift amount d that gives a local minimal value Corr(d) of a continuous correlation amount is calculated by a three-point interpolation using a correlation amount Corr (m) (m is a shift amount for the local minimal value) and correlation amounts calculated with shift amounts close to m. A coincidence degree FLVL of the paired image signals is defined as Corr(d) at the highest correlation among the correlation amounts Corr(1) calculated by Expression (1).

When the defocus amount is large, the paired image signals have a significant asymmetry, which leads to a large FLVL and thus to a degradation of the reliability. Typically, the FLVL for the defocus amount is calculated to be lower and thus the reliability becomes higher as the position of the focus lens 104 becomes closer to the in-focus position.

Next, a contrast PB of the paired image signals is calculated as described below. When $a_{max}$ represents a maximum value among a1 to an, $a_{min}$ represents a minimum value among a1 to an, $b_{max}$ represents a maximum value among b1 to bn, and $b_{min}$ represents a minimum value among b1 to bn, a contrast PBa of one of the paired image signals and a contrast PBb of the other of the paired image signals are expressed as follows.

$$PBa = a_{max} - a_{min} \quad (2)$$

$$PBb = b_{max} - b_{min} \quad (3)$$

The contrast PB of the paired image signals is defined as a smaller value of PBa and PBb calculated by Expressions (2) and (3).

The reliability is calculated by normalizing the coincidence degree FLVL and the contrast PB of the paired image signals. As the coincidence degree FLVL becomes lower and the contrast PB becomes higher, the reliability becomes higher.

The processes at steps 101 to 104 do not necessarily need to be performed after the start of the AF process, but may be performed before the start of the AF process.

Figure 6:
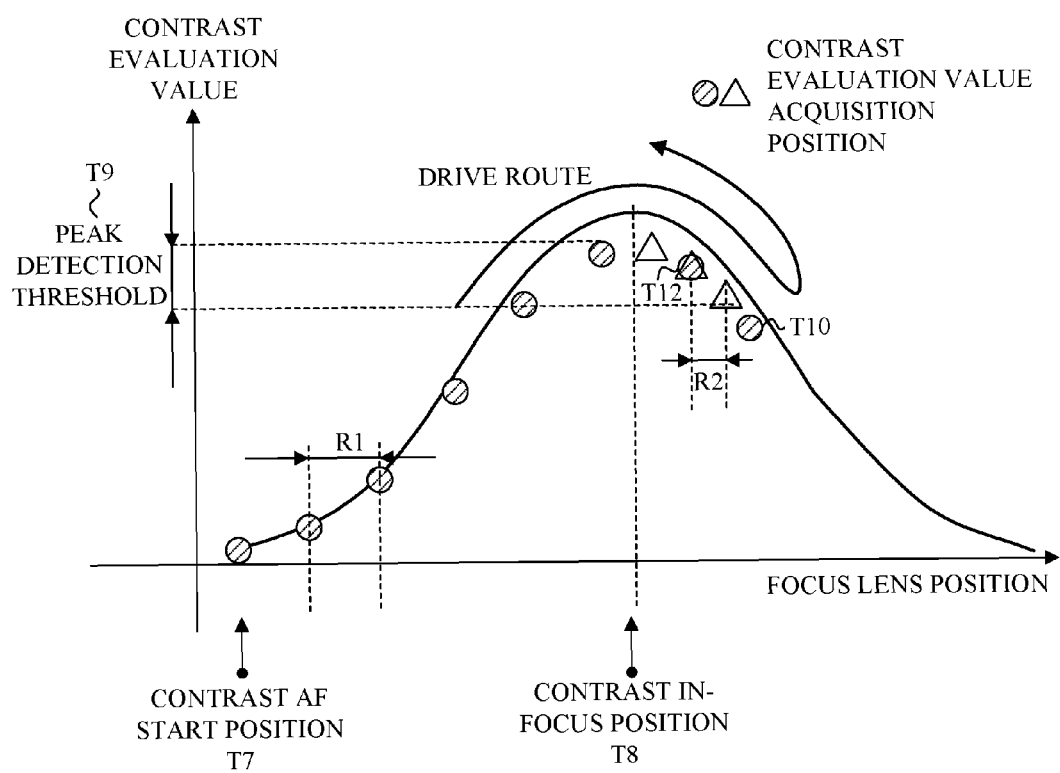
FIG. 6 illustrates a relation between a position of the focus lens and a contrast evaluation value in the contrast AF in this embodiment.

Next, at step 105, the camera MPU 125 determines whether or not a peak of the contrast evaluation value is detected. Specifically, as illustrated in FIG. 6, the camera MPU 125 determines whether or not a change of the contrast evaluation value with the drive of the focus lens 104 from increasing to decreasing occurs (T12) and a decrease equal to or more than a peak determination threshold T9 occurs. FIG. 6 is described further in detail later). If the peak is detected, the camera MPU 125 proceeds to step 106 to calculate a drive amount of the focus lens 104 to drive the focus lens 104 to a contrast in-focus position T11 at which the peak is detected. Then, the camera MPU 125 performs a control to drive the focus lens 104 to the contrast in-focus position through the lens MPU 117 at step 107 and then ends the contrast AF.

On the other hand, if no peak is detected at step 105, the camera MPU 125 determines at step 108 whether or not the reliability of the phase difference focus detection calculated at step 104 is higher than an in-focus threshold (first reliability). The in-focus threshold is a lowest reliability at which at least a focus state within the above-mentioned in-focus range can be obtained by driving the focus lens 104 by the in-focus drive amount calculated on a basis of the defocus amount acquired by the phase difference focus detection.

If the reliability is higher than the in-focus threshold at step 108, the camera MPU 125 proceeds to step 109. At step 109, the camera MPU 125 determines whether or not the detected defocus amount acquired by the phase difference focus detection is equal to or larger than a first defocus amount. The first defocus amount is defined such that, when the detected defocus amount smaller than the first defocus amount is detected, driving the focus lens 104 by the in-focus drive amount calculated from the detected defocus amount can provide an in-focus state (that is, the defocus amount becomes within the in-focus range). For example, the first defocus amount is set to be equal to or smaller than a depth of field. When δ represents a diameter of permissible circle of confusion, and F represents an aperture value, the depth of field for the aperture value F is ±Fδ. If the detected defocus amount is equal to or larger than the first defocus amount, the camera MPU 125 proceeds to step 110.

FIG. 3A illustrates an exemplary control of the drive of the focus lens 104 when the detected defocus amount is larger than the first defocus amount at step 109. In FIG. 3A, T1 represents a position of the focus lens 104 corresponding to the detected defocus amount calculated at step 103 (the position is hereinafter referred to as "a pre-AF position"). T2 represents a position where the focus lens 104 reaches when the camera MPU 125 drives the focus lens 104 from the pre-AF position T1 by the in-focus drive amount calculated on the basis of the detected defocus amount.

At step 110, the camera MPU 125 calculates a drive amount for driving the focus lens 104 from the pre-AF position T1 to a position (lens reaching position) T3 nearer than the AF in-focus position T2 by a first non-drive amount, in other words, calculates a first drive amount smaller than the in-focus drive amount by the first non-drive amount. Then, at step 111, the camera MPU 125 drives the focus lens 104 by the calculated first drive amount. The drive of the focus lens 104 by such a first drive amount avoids the focus lens 104 from being driven beyond a true in-focus position; the drive therebeyond is due to a large error amount included in the in-focus drive amount calculated on a basis of a large detected defocus amount. The camera MPU 125 may change the first non-drive amount such that the first non-drive amount increases as the defocus amount increases. Thereafter, the camera MPU 125 returns to step 101.

On the other hand, if the detected defocus amount is smaller than the first defocus amount at step 109, the camera MPU 125 calculates at step 112 the in-focus drive amount from the detected defocus amount calculated at step 103. Then, at step 113, the camera MPU 125 drives the focus lens 104 by the calculated in-focus drive amount.

FIG. 3B illustrates an exemplary control of the drive of the focus lens 104 when the detected defocus amount is smaller than the first defocus amount. In this example, the camera MPU 125 calculates the in-focus drive amount for driving the focus lens 104 from the pre-AF position T1 to the phase difference in-focus position T2. Then, the camera MPU 125 drives the focus lens 104 by the in-focus drive amount. Accordingly, the position T3 of the focus lens 104 after the drive coincides with the phase difference in-focus position T2.

Thereafter, the camera MPU 125 performs at step 114 an exposure of the image sensor 122, calculates the phase difference between the paired image signals again and then calculates the detected defocus amount from the calculated phase difference. Furthermore, at this step, the camera MPU 125 determines whether or not the detected defocus amount is within the in-focus range, in other words, whether or not the in-focus state is obtained. If the in-focus state is obtained, the camera MPU 125 ends the AF process. If the in-focus state is not obtained, the camera MPU 125 returns to step 112.

Although this embodiment describes the case of checking whether or not the in-focus state is obtained at step 114 after the focus lens 104 is driven at step 113, this check is not necessarily needed. For example, if the in-focus drive amount calculated at step 112 is smaller than a predetermined value, it may be determined that the detected defocus amount and the in-focus drive amount have negligible errors, and the check of the in-focus state may be omitted.

If it is determined that it is impossible to obtain an in-focus state by the imaging surface phase difference AF at steps 108 and 115 because the reliability of the phase difference focus detection is low, the camera MPU 125 may return to step 101 to perform the contrast AF only.

Alternatively, if the reliability of the phase difference focus detection changes in a next routine from one higher than the in-focus threshold to one lower than the in-focus threshold, the camera MPU 125 may forcibly switch the AF from the imaging surface phase difference AF to the contrast AF.

If the reliability of the phase difference focus detection is lower than the in-focus threshold at step 108, the camera MPU 125 determines at step 115 whether or not the reliability is higher than a usable defocus amount threshold (second reliability). The usable defocus amount threshold is a lowest reliability at which a supplementary use of the detected defocus amount acquired by the phase difference focus detection is allowed on an assumption that a final in-focus state is to be obtained by the contrast AF.

If the reliability is higher than the usable defocus amount threshold, the camera MPU 125 determines at step 116 whether or not the detected defocus amount is equal to or larger than a second defocus amount. The second defocus amount is a defocus amount that allows the contrast focus detection from a position at which a sufficient drive amount is ensured in order to detect the peak of the contrast evaluation value (in other words, in order to detect the contrast in-focus position). For example, when the contrast evaluation value is acquired at each drive of the focus lens 104 by an AF pitch amount R in the contrast focus detection, the second defocus amount is set to 3×R.

If the detected defocus amount is equal to or larger than the second defocus amount, the camera MPU 125 proceeds to step 110. FIG. 3C illustrates an exemplary control of the drive of the focus lens 104 when the detected defocus amount is larger than the second defocus amount at step 116. At step 110, the camera MPU 125 calculates a drive amount for driving the focus lens 104 from the pre-AF position T1 to the position T3 nearer than the AF in-focus position T2 by a second non-drive amount, in other words, calculates a second drive amount smaller than the in-focus drive amount by the second non-drive amount. The second non-drive amount is set such that the focus lens 104 after being driven by the second drive amount is located at a position at which a sufficient drive amount is ensured in order to acquire the peak of the contrast evaluation value while driving the focus lens 104 in the contrast focus detection to be performed at subsequent routines. The camera MPU 125 may change the second non-drive amount such that the second non-drive amount increases as the defocus amount increases. Then, at step 111, the camera MPU 125 drives the focus lens 104 by this calculated second drive amount. Thereafter, the camera MPU 125 returns to step 101.

If the detected defocus amount is smaller than the second defocus amount at step 116, the camera MPU 125 considers at step 117 that the focus lens 104 is located near the contrast in-focus position. FIG. 3D illustrates an exemplary control of the drive of the focus lens 104 when the detected defocus amount is smaller than the second defocus amount at step 116.

The camera MPU 125 sets the AF pitch amount of the focus lens 104 in the contrast focus detection to the second pitch amount R2 smaller than the above-described first pitch amount to perform the contrast AF. Then, the camera MPU 125 drives at step 118 the focus lens 104 by the second pitch amount R2. This enables an accurate detection of the contrast in-focus position with a fine resolution compared to a case of acquiring the contrast evaluation value at each drive of the focus lens 104 by the first pitch amount. This will be described further in detail later. Thereafter, the camera MPU 125 returns to step 101.

On the other hand, if the reliability of the phase difference focus detection is lower than the usable defocus amount threshold (that is, the imaging surface phase difference AF cannot be used) at step 115, the camera MPU 125 proceeds to step 119. At step 119, the camera MPU 125 sets the AF pitch amount of the focus lens 104 in the contrast focus detection to the first pitch amount in order to perform the contrast AF. This facilitates detecting a change of the contrast evaluation value even when the object has a low contrast as described later. Then, the camera MPU 125 drives the focus lens 104 by the first pitch amount at step 120. Thereafter, the camera MPU 125 returns to step 101.

Figure 4:
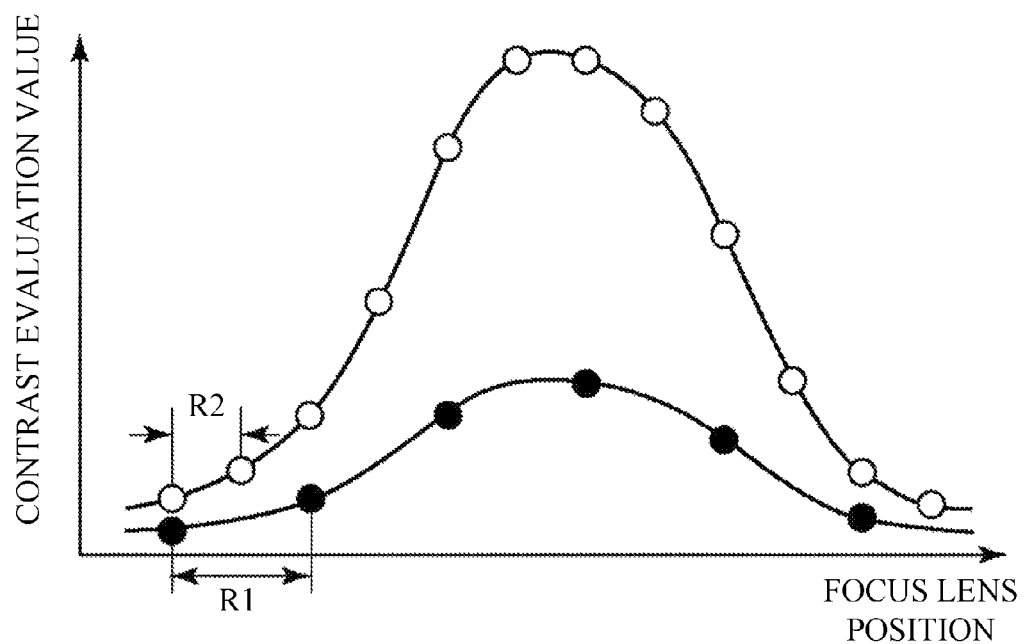
FIG. 4 is an explanatory diagram of a pitch amount of the focus lens in a contrast AF in this embodiment.

FIG. 4 illustrates a relation between the first and second pitch amounts and the contrast evaluation value. In FIG. 4, a horizontal axis represents the position of the focus lens 104, and a vertical axis represents the contrast evaluation value.

In general, the contrast evaluation value becomes larger as a contrast of the object, that is, a difference between bright and dark parts of the object becomes higher. Furthermore, as a luminance of the object becomes higher, the contrast becomes higher and the contrast evaluation value becomes larger. Thus, a change amount of the contrast evaluation value for the drive amount (AF pitch amount) of the focus lens 104 varies depending on the contrast and luminance of the object.

In FIG. 4, a graph connecting white circles illustrates an example of the change of the contrast evaluation value for the drive amount of the focus lens 104 when the object has a high contrast and a high luminance (the reliability of the phase difference focus detection is at least higher than the usable defocus amount threshold). A graph connecting black circles illustrates an example of the change of the contrast evaluation value for the drive amount of the focus lens 104 when the object has a low contrast and a low luminance (the reliability of the phase difference focus detection is lower than the usable defocus amount threshold). The white circles and black circles each represent a position of the focus lens 104 at which the contrast evaluation value is acquired.

Since the change of the contrast evaluation value for the drive amount of the focus lens 104 is large when the object has a high contrast and a high luminance, the AF pitch amount of the focus lens 104 is set to the second pitch amount R2 smaller than the first pitch amount R1. For example, the AF pitch amount of the focus lens 104 is set to R2=½×R1. This enables highly accurate detection of a position at which the contrast evaluation value reaches the peak.

On the other hand, when the object has a low contrast and a low luminance, the change of the contrast evaluation value for the drive amount of the focus lens 104 is small. Thus, setting the AF pitch amount of the focus lens 104 to the second pitch amount R2, which is small, fails to achieve a detection of a clear change of the contrast evaluation value. In general, the contrast evaluation value includes, in addition to a contrast component corresponding to the contrast of the object, signal noise and noise due to a change of a situation of the object. Thus, when the contrast evaluation value is low or the change of the contrast evaluation value at each drive of the focus lens 104 is small, any influence of the noise may adversely cause a change not corresponding to the contrast of the object in the contrast evaluation value. This may result in the drive of the focus lens 104 in a direction different from a direction toward a true contrast in-focus position. Thus, when the object has a low contrast and a low luminance, the AF pitch amount of the focus lens 104 is set to the first pitch amount R1, which facilitates correctly detecting the change of the contrast evaluation value.

Figure 5:
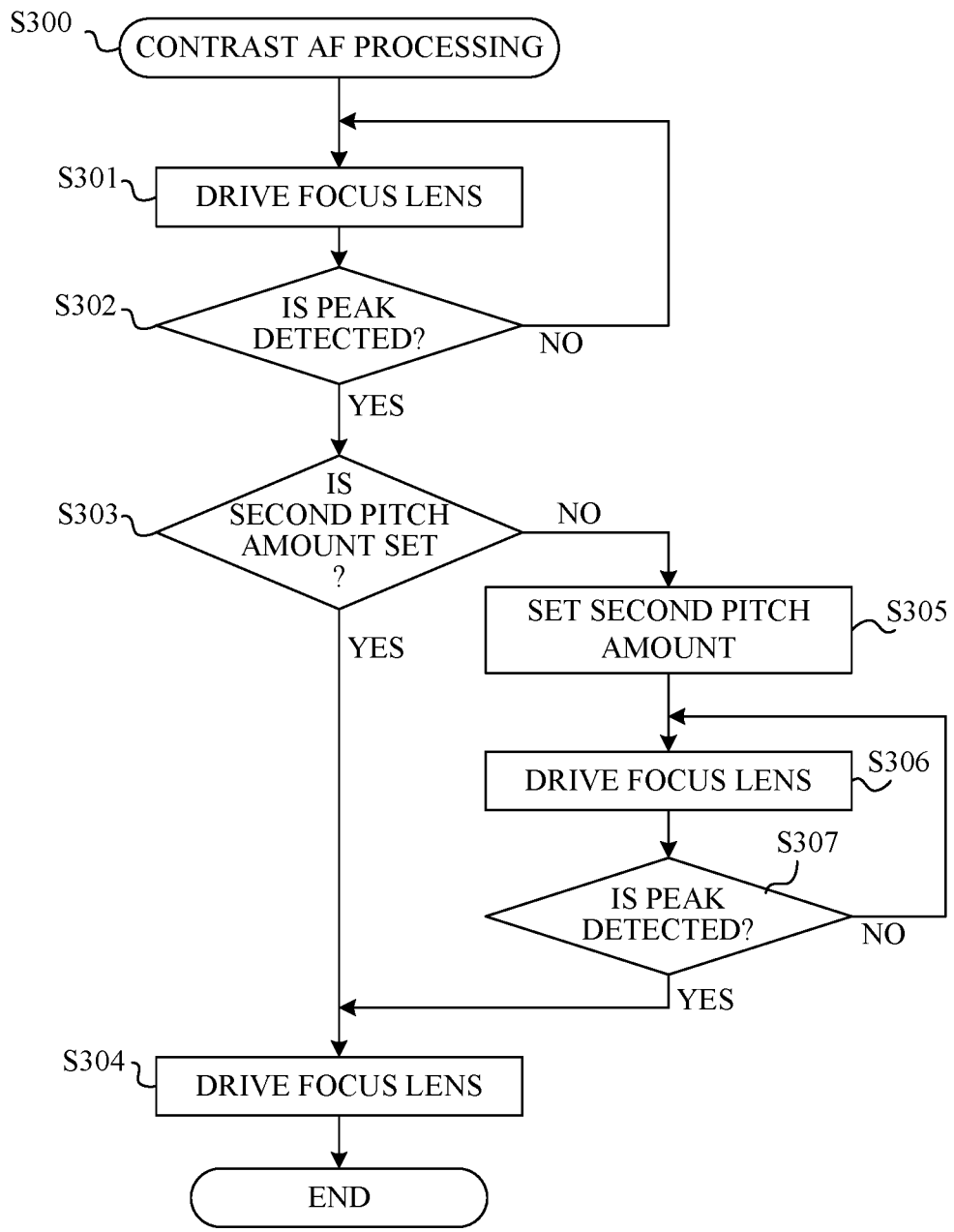
FIG. 5 is a flowchart of a process in the contrast AF in this embodiment.

With reference to a flowchart in FIG. 5, a process of the contrast AF will be described. FIG. 6 schematically illustrates a relation between the position (horizontal axis) of the focus lens 104 and the contrast evaluation value (vertical axis) in the contrast AF. A hatched circle represents the position (hereinafter referred to as "a contrast evaluation value acquisition position") of the focus lens 104 at which the contrast evaluation value is acquired before the peak of the contrast evaluation value is detected.

At step 301, the camera MPU 125 acquires the contrast evaluation value while driving the focus lens 104 from a start position T7 (one of a close-distance end and an infinity end) of the contrast AF. During this step, if having determined at step 115 in FIG. 1 that the reliability of the phase difference focus detection is lower than the usable defocus amount threshold (in other words, if the contrast of the object is low), the camera MPU 125 sets the AF pitch amount of the focus lens 104 to the first pitch amount R1. Alternatively, if having determined at steps 115 and 116 in FIG. 1 that the reliability of the phase difference focus detection is higher than the usable defocus amount threshold and the detected defocus amount is smaller than the second defocus amount, the camera MPU 125 sets the AF pitch amount of the focus lens 104 to the second pitch amount R2. FIG. 6 illustrates a case in which the AF pitch amount at this point is the first pitch amount R1.

Next, at step 302, the camera MPU 125 determines whether or not the peak of the contrast evaluation value is detected, in other words, whether or not the change of the contrast evaluation value from increasing to decreasing occurs and the decrease equal to or larger than the peak determination threshold T9 occurs. In FIG. 6, the decrease equal to or larger than the peak determination threshold T9 is not obtained at the contrast evaluation value T12 immediately after the change of the contrast evaluation value from increasing to decreasing occurs, but is obtained at a next contrast evaluation value T10. Then, the camera MPU 125 proceeds to step 303 if the peak is detected, or returns to step 301 if no peak is detected.

At step 303, the camera MPU 125 determines whether or not the AF pitch amount of the focus lens 104 currently set is the second pitch amount R2. Description here is made of a case in which the AF pitch amount is set to the first pitch amount R1 and therefore the camera MPU 125 proceeds to step 305. If the current AF pitch amount of the focus lens 104 is set to the second pitch amount, the camera MPU 125 proceeds from step 303 to step 304.

At step 305, the camera MPU 125 sets (changes) the AF pitch amount of the focus lens 104 to the second pitch amount R2.

Subsequently, at step 306, the camera MPU 125 inverts a drive direction of the focus lens 104. Then, as illustrated with triangles in FIG. 6, the camera MPU 125 acquires the contrast evaluation value at each drive of the focus lens 104 by the second pitch amount R2 in a direction in which the contrast evaluation value increases (goes back to the peak).

Then, at step 307, the camera MPU 125 determines, after each drive of the focus lens 104 by the second pitch amount R2, whether or not the peak of the contrast evaluation value is detected. Performing the determination after each drive of the focus lens 104 by the second pitch amount R2 smaller than the first pitch amount R1 enables detecting the peak with a finer resolution. Accordingly, the contrast in-focus position at which the contrast evaluation value closer to a true peak is obtained can be detected. The camera MPU 125 returns to step 306 if no peak is detected, or proceeds to step 304 if the peak is detected.

At step 304, the camera MPU 125 drives the focus lens 104 to the contrast in-focus position detected at step 302 or step 307, and then ends the contrast AF.

As described above, this embodiment changes the drive amount of the focus lens 104 in the imaging surface phase difference AF and performs the contrast AF, depending on the reliability of the phase difference focus detection and the detected defocus amount. Accordingly, the in-focus state of the image capturing system can be fast and highly accurately obtained for various kinds of objects.

Although this embodiment described the case of focusing by driving the focus lens 104 as the focus element in the optical axis direction, the focusing may be performed by driving (moving) the image sensor 122 as the focus element in the optical axis direction.

This embodiment described the case in which the camera MPU 125 provided to the lens-interchangeable camera body (optical apparatus including the image sensor) 120 performs the phase difference AF and the contrast AF. However, the interchangeable lens unit 100 as an optical apparatus including an optical system may be provided with the first and second focus detectors, the reliability acquirer and the controller which are provided for performing the phase difference AF and the contrast AF. Alternatively, a lens-integrated camera (optical apparatus including an optical system and an image sensor) may be provided with the first and second focus detectors, the reliability acquirer and the controller.

According to this embodiment, the in-focus state of the image capturing system can be fast and highly accurately obtained for various kinds of objects by changing the drive amount of the focus element in the phase difference AF and by performing the contrast AF depending on the reliability of the phase difference focus detection and the defocus amount.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254163, filed on Dec. 16, 2014, which is hereby incorporated by reference wherein in its entirety.

What is claimed is:

1. A focus control apparatus configured to control drive of a focus element movable in an image capturing system that photoelectrically converts, by an image sensor, an object image formed by an optical system, the apparatus comprising:
   a first focus detector configured to perform a phase difference focus detection to calculate, from a phase difference between paired image signals produced using an output from the image sensor, a defocus amount of the image capturing system;
   a second focus detector configured to produce, with the focus element being driven, a contrast evaluation value corresponding to a contrast of the object image using the output from the image sensor;
   a reliability acquirer configured to acquire a reliability of the phase difference focus detection on a basis of a coincidence degree of the paired image signals and a contrast of the paired image signals; and
   a controller configured (a) to control the drive of the focus element on a basis of a phase difference in-focus drive amount that is a drive amount of the focus element to bring the image capturing system into a phase difference in-focus state and that is calculated from the defocus amount and (b) to control the drive of the focus element to bring the image capturing system into a contrast in-focus state by using the contrast evaluation value,
   wherein the controller is configured to drive the focus element by following drive amounts:
   when the reliability is higher than a first reliability and the defocus amount is larger than a first defocus amount, a first drive amount that is smaller than the phase difference in-focus drive amount by a first non-drive amount;
   when the reliability is higher than the first reliability and the defocus amount is smaller than the first defocus amount, the phase difference in-focus drive amount; and
   when the reliability is lower than the first reliability and higher than a second reliability and the defocus amount is larger than a second defocus amount, a second drive amount that is smaller than the phase difference in-focus drive amount by a second non-drive amount, and
   the controller is configured to drive the focus element, (a) when the reliability is lower than the first reliability and higher than the second reliability and the defocus amount is smaller than the second defocus amount and (b) when the reliability is lower than the second reliability, by using the contrast evaluation value.

2. A focus control apparatus according to claim 1, wherein the controller is configured to:
   acquire, when the reliability is lower than the second reliability, the contrast evaluation value at each drive of the focus element by a first predetermined amount to control the drive of the focus element by using the acquired contrast evaluation value; and
   acquire, when the reliability is lower than the first reliability and higher than the second reliability and the defocus amount is smaller than the second defocus amount, the contrast evaluation value at each drive of the focus element by a second predetermined amount smaller than the first predetermined amount to control the drive of the focus element by using the acquired contrast evaluation value.

3. A focus control apparatus according to claim 1, wherein the controller is configured to change the first non-drive amount and the second non-drive amount depending on the defocus amount.

4. A focus control apparatus according to claim 1, wherein the controller is configured to control, when the reliability has changed from a reliability higher than the first reliability to a reliability lower than the first reliability, the drive of the focus element by using the contrast evaluation value.

5. An optical apparatus comprising:
a focus control apparatus configured to control drive of a focus element movable in an image capturing system that photoelectrically converts, by an image sensor, an object image formed by an optical system; and
at least one of the optical system and the image sensor, wherein the focus control apparatus comprises:
a first focus detector configured to perform a phase difference focus detection to calculate, from a phase difference between paired image signals produced using an output from the image sensor, a defocus amount of the image capturing system;
a second focus detector configured to produce, with the focus element being driven, a contrast evaluation value corresponding to a contrast of the object image using the output from the image sensor;
a reliability acquirer configured to acquire a reliability of the phase difference focus detection on a basis of a coincidence degree of the paired image signals and a contrast of the paired image signals; and
a controller configured (a) to control the drive of the focus element on a basis of a phase difference in-focus drive amount that is a drive amount of the focus element to bring the image capturing system into a phase difference in-focus state and that is calculated from the defocus amount and (b) to control the drive of the focus element to bring the image capturing system into a contrast in-focus state by using the contrast evaluation value,
wherein the controller is configured to drive the focus element by following drive amounts:
when the reliability is higher than a first reliability and the defocus amount is larger than a first defocus amount, by a first drive amount that is smaller than the phase difference in-focus drive amount by a first non-drive amount;
when the reliability is higher than the first reliability and the defocus amount is smaller than the first defocus amount, by the phase difference in-focus drive amount; and
when the reliability is lower than the first reliability and higher than a second reliability and the defocus amount is larger than a second defocus amount, by a second drive amount that is smaller than the phase difference in-focus drive amount by a second non-drive amount, and
the controller is configured to drive the focus element, (a) when the reliability is lower than the first reliability and higher than the second reliability and the defocus amount is smaller than the second defocus amount and (b) when the reliability is lower than the second reliability, by using the contrast evaluation value.

6. A focus control method of controlling drive of a focus element movable in an image capturing system that photoelectrically converts, by an image sensor, an object image formed by an optical system, the method comprising:
a step of performing a phase difference focus detection to calculate, from a phase difference between paired image signals produced using an output from the image sensor, a defocus amount of the image capturing system;
a step of producing, with the focus element being driven, a contrast evaluation value corresponding to a contrast of the object image using the output from the image sensor;
a step of acquiring a reliability of the phase difference focus detection on a basis of a coincidence degree of the paired image signals and a contrast of the paired image signals; and
a control step of controlling the drive of the focus element on a basis of a phase difference in-focus drive amount that is a drive amount of the focus element to bring the image capturing system into a phase difference in-focus state and that is calculated from the defocus amount and of controlling the drive of the focus element to bring the image capturing system into a contrast in-focus state by using the contrast evaluation value,
wherein at the control step the method drives the focus element by following drive amounts:
when the reliability is higher than a first reliability and the defocus amount is larger than a first defocus amount, a first drive amount that is smaller than the phase difference in-focus drive amount by a first non-drive amount;
when the reliability is higher than the first reliability and the defocus amount is smaller than the first defocus amount, the phase difference in-focus drive amount; and
when the reliability is lower than the first reliability and higher than a second reliability and the defocus amount is larger than a second defocus amount, a second drive amount that is smaller than the phase difference in-focus drive amount by a second non-drive amount, and
the method drives the focus element, (a) when the reliability is lower than the first reliability and higher than the second reliability and the defocus amount is smaller than the second defocus amount and (b) when the reliability is lower than the second reliability, by using the contrast evaluation value.

7. A non-transitory computer-readable storage medium storing a focus control program as a computer program to cause a computer of an optical apparatus configured to control drive of a focus element movable in an image capturing system that photoelectrically converts, by an image sensor, an object image formed through an optical system, the computer program causing the computer to:
perform a phase difference focus detection to calculate, from a phase difference between paired image signals produced using an output from the image sensor, a defocus amount of the image capturing system;
produce, with the focus element being driven, a contrast evaluation value corresponding to a contrast of the object image using the output from the image sensor;
acquire a reliability of the phase difference focus detection on a basis of a coincidence degree of the paired image signals and a contrast of the paired image signals; and
perform a control process (a) to control the drive of the focus element on a basis of a phase difference in-focus drive amount that is a drive amount of the focus element to bring the image capturing system into a phase difference in-focus state and that is calculated from the defocus amount and (b) to control the drive of the focus element to bring the image capturing system into a contrast in-focus state by using the contrast evaluation value,
wherein the computer program causes in the control process the computer to drive the focus element by following drive amounts:
when the reliability is higher than a first reliability and the defocus amount is larger than a first defocus amount, a first drive amount that is smaller than the phase difference in-focus drive amount by a first non-drive amount;
when the reliability is higher than the first reliability and the defocus amount is smaller than the first defocus amount, the phase difference in-focus drive amount; and
when the reliability is lower than the first reliability and higher than a second reliability and the defocus amount is larger than a second defocus amount, a second drive amount that is smaller than the phase difference in-focus drive amount by a second non-drive amount, and
the computer program causes in the control process the computer to drive the focus element, (a) when the reliability is lower than the first reliability and higher than the second reliability and the defocus amount is smaller than the second defocus amount and (b) when the reliability is lower than the second reliability, by using the contrast evaluation value.

\* \* \* \* \*